(12) United States Patent
Masaki et al.

(10) Patent No.: US 6,245,283 B1
(45) Date of Patent: Jun. 12, 2001

(54) METHOD FOR PRODUCTION OF FIBER-BOND TYPE CERAMIC MATERIAL AND ENGINE PARTS FORMED THEREOF

(75) Inventors: Shouju Masaki, Tachikawa; Takemi Yamamura, Ube; Tetsurou Hirokawa; Takeshi Tanamura, both of Youkaichi, all of (JP)

(73) Assignees: Ishikawajima-Harima Heavy Industries, Tokyo; Ube Industries, Ltd., Yamaguchi-ken; Shikibo, Ltd., Osaka-fu, all of (JP)

( * ) Notice: Subject to any disclaimer, the term of this patent is extended or adjusted under 35 U.S.C. 154(b) by 0 days.

(21) Appl. No.: 09/159,581

(22) Filed: Sep. 24, 1998

(30) Foreign Application Priority Data

Sep. 25, 1997 (JP) .................................................. 9-260347

(51) Int. Cl.$^7$ ....................................................... C04B 35/80
(52) U.S. Cl. ........................... 264/627; 264/624; 264/625; 264/639; 264/640; 264/324
(58) Field of Search ..................................... 264/624, 625, 264/627, 639, 640, 324

(56) References Cited

U.S. PATENT DOCUMENTS 4,837,230 * 6/1989 Chen et al. ........................... 264/639
4,990,470 * 2/1991 Yamamura et al. ..................... 501/95
5,350,545 * 9/1994 Streckert et al. ...................... 264/639
5,707,471 * 1/1998 Petrak et al. ........................... 264/624

FOREIGN PATENT DOCUMENTS 2 259 299   3/1993  (GB) .
  2579854  11/1996  (JP) .

* cited by examiner

Primary Examiner—James Derrington
(74) Attorney, Agent, or Firm—Griffin & Szipl, P.C.

(57) ABSTRACT

A fiber-bond type ceramic material 4 is produced by using as raw material fibers 1 inorganic fibers of Si—M—C—O synthesized by melt spinning polycarbosilane, then infusibilizing the produced threads, and firing the set threads, forming from the raw material fibers a woven fabric 2 having all the fibers thereof extended perpendicularly or obliquely relative to the direction of compression during the course of a hot-press fabrication at a weaving step 12, heat-treating the woven fabric in the air, thereby preparing a woven fabric of oxidized fibers 3 provided with an oxide layer on the surface thereof at an oxidizing step 14, and subjecting the woven fabric of oxidized fibers to a hot-press fabrication while compressing the fabric in the direction of the compression thereby causing the oxide layers on the surface to adhere fast to each other and form a matrix at a hot-press step 16.

4 Claims, 3 Drawing Sheets

METHOD FOR PRODUCTION OF FIBER-BOND TYPE CERAMIC MATERIAL AND ENGINE PARTS FORMED THEREOF

BACKGROUND OF THE INVENTION

1. Field of the Invention

This invention relates to a fiber bond type ceramic material, and, more particularly, to a method for the production of a ceramic material of the type having fibers three dimensionally bonded thereto, and engine parts formed of the material.

2. Description of Related Art

A Si—Ti—C—O fiber bond type ceramic material (sold under the trademark of "Tyrannohex [transliteration]") produced by pressing surface-oxidized Si—M—C—O fibers (sold under the trademark of "Tyranno [transliteration] Fibers") has been published ("Microstructure and Characteristics of Si—Ti—C—O Fiber-bond Type Ceramic Material," Jul. 18, 1995, the 76th Ceramic Material Division Committee of Japan Material Society, for example) and has been the subject of patents (Japanese Patent No. 2,579,854, titled "Inorganic fiber sinter and method for production thereof").

The Tyranno fibers (Si—M—C—O-fibers, M means metal) are inorganic fibers of Si—M—C—O synthesized by melt spinning polymetalocarbosilane, then infusibilizing the produced threads, and firing the set threads. The Tyrannohex (Si—M—C—O fiber-bond type ceramic) material is produced by heat-treating the Tyranno fibers in the air and obtaining oxidized Tyranno fibers having an oxide layer on the surface thereof, preparing unidirectional prepreg sheets from the fibers, superimposing the sheets uniformly in alignment, and compressing the superimposing sheets with a hot press machine at an elevated temperature.

In the Tyrannohex material constructed as described above, a matrix layer has been formed by hot-pressing oxidized fibers and the gaps between the adjacent fibers are uniformly filled with the oxide formerly existent on the surface of the raw material fibers and consequently allowed to form a dense texture veritably destitute of pores. Further, since the Tyranno fibers themselves possess high mechanical properties and excellent heat-resistance and oxidation-resistance, the Tyrannohex material likewise excels in mechanical strength and in heat-resistance and oxidation-resistance.

Machining the Tyrannohex material to manufacture engine parts by making the best use of such characteristics of the Tyrannohex (fiber-bond type ceramic) material has been desired. When some turbine parts as, for example, rotor blades and stationary vanes, shrouds, combustors, the afterburner flaps, and split-structure liners are produced by machining the Tyrannohex material, the parts have a heightened heat-resistant strength (not lower than 1400° C.) and a decreased weight (specific gravity about 2.6) as compared with equivalent turbine parts made of the conventional heat-resistant metal (tolerable temperature about 1000° C. and specific gravity about 8).

The Tyrannohex material, however, has the problem of readily sustaining tears when it is cut in fabricating a turbine part. When a unidirectional Tyrannohex material is clamped in a vice and a cut is made in the material in a direction perpendicular to the fibers therein. For example, the complex stress originating in the friction resistance generated by the rotational of a grindstone and the rotation moment generated during the course of cutting under the weight of the grindstone possibly acts on the boundaries of the fibers and causes separation of the fibers at the interfaces.

When then the Tyranno fibers are two-dimensionally woven and they are superposed to produce a Tyrannohex material for the purpose of overcoming the problem mentioned above, the Tyrannohex material has the further problem of readily sustaining separation of superposed weaves at the interfaces when the material is subjected to machining.

Further, attempts to produce a Tyrannohex material by orthogonally weaving Tyranno fibers in such a construction as contains fibers parallel to the direction of compression for the purpose of precluding this separation, suffer from the disadvantage that the raw material fibers, during the course of hot-press fabrication, form kinks and incur a heavy loss of strength, have voids produced readily therein, and prevent formation of a dense matrix layer, with the result that the produced Tyrannohex material will have an unduly low volumetric fiber content and will exhibit serious degradation of heat-resistant strength.

SUMMARY OF THE INVENTION

This invention has been created with a view to solving the problems mentioned above. Specifically, this invention has for an object thereof the provision of a method for the production of a fiber-bond type 3 dimensionally strengthened ceramic material which does not easily peel or crack in the boundary faces or superimposed faces of fibers. Another object is that the raw material fibers suffers scant injury during the course of hot-press fabrication that there are no voids produced therein. Consequently, achievement of these objects enables these raw material fibers to form a dense matrix layer, and allows the produced ceramic material to acquire a high fiber content and allows engine parts to be made of the ceramic material.

According to the present invention, there is provided a method for the production of a fiber-bond type ceramic material, characterized by using, as raw material fibers, inorganic fibers of Si—M—C—O synthesized by melt spinning polymetalocarbosilane, then infusibilizing the produced threads, and firing the set threads, forming from the raw material fibers a woven fabric having all the fibers thereof extending perpendicularly or obliquely relative to the direction of compression during the course of a hot-press fabrication, heat-treating the woven fabric in the air thereby preparing a woven fabric of oxidized fibers provided with an oxide layer on the surface thereof, and subjecting the woven fabric of oxidized fibers to a hot-press fabrication while compressing the fabric in the direction of compression mentioned above thereby causing oxide layers on the surface to adhere fastly to each other and form a matrix.

According to the method of this invention mentioned above, since all the fibers (Tyranno fibers) that form the woven fabric are extended perpendicularly or obliquely relative to the direction of compression during the course of the hot-press fabrication, the compressing force exerted during the course of the hot-press fabrication acts in the lateral direction on the fibers. The fibers, therefore, do not easily kink or shear. Further, since the compressing force acts in the direction of contracting the distances between the fibers, the fibers produce no voids and allow formation of a dense matrix layer. The fiber-bond type ceramic material to be produced, therefore, has a high fiber volumetric content and high heat-resistant strength. The ceramic material having the fibers three-dimensionally bonded thereto does not readily peel or crack in the boundary faces or superimposed faces of the fibers because it acquires a dense texture containing very few pores between the fibers.

Engine parts which are produced by shaping the fiber-bond type ceramic material manufactured as described above do not easily peel or crack in the boundary faces or superimposed faces of the fibers.

According to a preferred embodiment of this invention, a biaxial three-dimensional woven fabric is formed by preparing wefts and warps both of the raw material fibers, laying the wefts in numerous layers, and causing the warps to intersect each other as laid between two or more layers of wefts. By this method, the compressing force generated during the course of the hot-press fabrication can be caused to act nearly perpendicularly on both the warps and wefts and ensure production of a fiber-bond type ceramic material of dense texture.

It is also permissible to form a woven fabric by preparing biaxial two-dimensional planar woven fabrics using wefts and warps both of the raw material fibers, superimposing the planar woven fabrics, and uniting the superposed woven fabrics with obliquely intersecting third threads. By this method, the compressing force of the hot-press fabrication can be caused to act nearly perpendicularly on the wefts and warps and obliquely on the third threads and enabled to ensure production of a fiber-bond type ceramic material of dense texture.

It is further permissible to form a woven fabric by preparatorily interlacing raw material fibers with short fibers of an identical substance thereby forming short fiber-bound fibers and superimposing these fibers as aligned perpendicularly to the direction of compression. By this method, the compressing force generated during the course of the hot-press fabrication can be caused to act perpendicularly on the fibers, preclude the occurrence of kinks in the fibers due to the contraction during the course of the hot-press fabrication, and minimize the possible formation of voids in the interfaces and consequently ensure relatively inexpensive production of a fiber-bond type ceramic material.

Other objects and advantageous characteristics of this invention will become apparent from the following Description of Preferred Embodiments, which makes reference to the accompanying drawings.

DESCRIPTION OF PREFERRED EMBODIMENTS

Preferred embodiments of this invention will be described below by reference to the accompanying diagrams.

Figure 1:
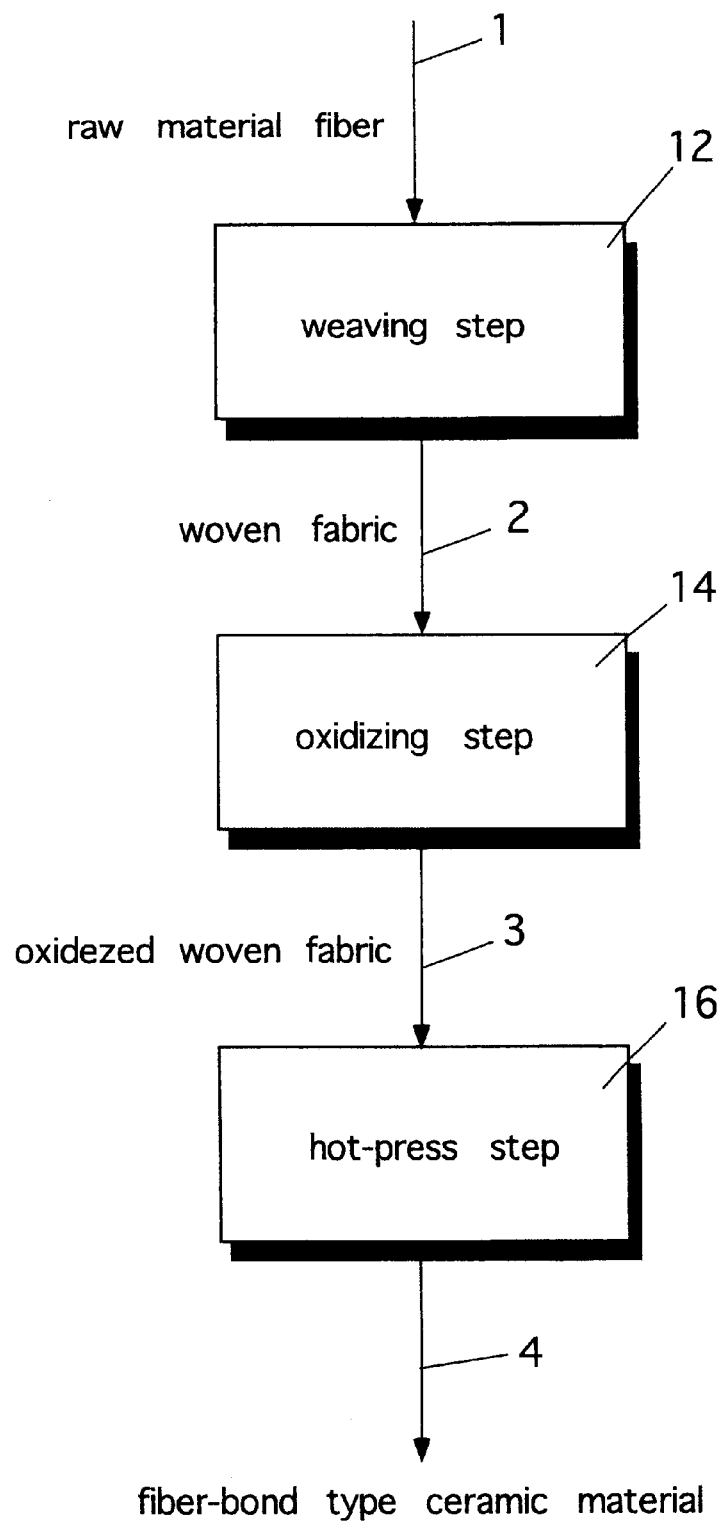
FIG. 1 is a flow diagram illustrating the method of this invention.

FIG. 1 is a flow diagram illustrating the method of the present invention. As shown in this diagram, the method for the production of a fiber-bond type ceramic material according to this invention comprises a weaving step 12 for forming a woven fabric 2 from raw material fibers 1, an oxidizing step 14 for oxidizing the woven fabric, and a hot-press step 16 for subjecting an oxidized woven fabric 3 to a hot-press treatment.

The raw material fibers 1 are the Tyranno fibers mentioned above, namely inorganic fibers of Si—M—C—O synthesized by melt spinning polytitanocarbosilane, then infusibilizing the produced threads, and firing the set threads.

The oxidizing step 14 consists in heat-treating the woven fabric 2 in the air and consequently converting it into the oxidized fiber woven fabric 3 provided on the surface thereof with an oxide layer. This step consists in performing the heat-treatment in the air kept in about 1150° C. for 10–40 hours thereby forming on the surface of the raw material fibers an oxide layer having an average thickness in the approximate range of 250–600 nm.

The hot-press step 16 consists of subjecting the woven fabric 3 formed of oxidized fibers to a hot-pressing fabrication while compressing it in a direction nearly perpendicular to the component fibers thereof thereby causing the oxidized layers on the surface to intimately and mutually adhere and form a matrix. This step is properly performed of a vacuum at an elevated temperature in about 1750° C. under a pressure of about 50 MPa. This step completes a fiber-bond type ceramic material 4.

Figure 2A:
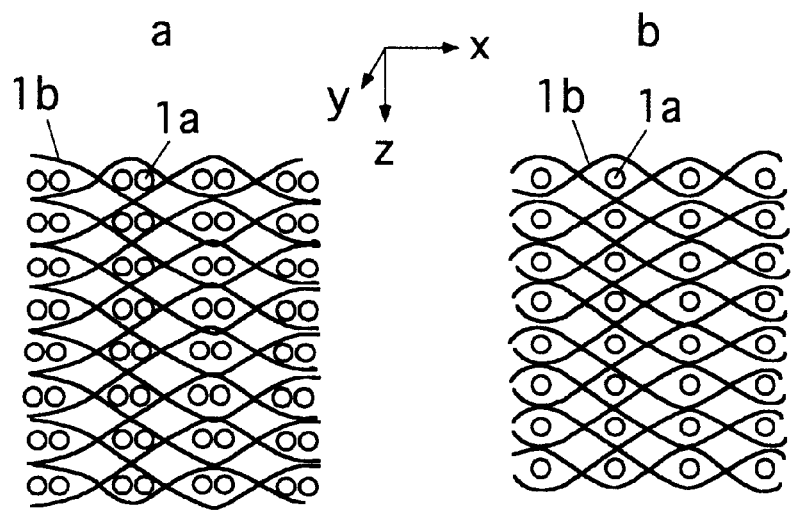
FIG. 2A is a model diagram illustrating the first method for forming a woven fabric according to the invention.
Figure 2B:
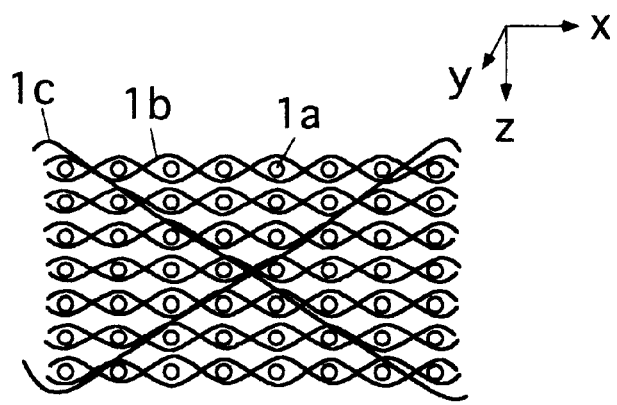
FIG. 2B is a model diagram illustrating the second method for forming a woven fabric according to the invention.

FIG. 2A is a model diagram illustrating the first method for the formation of the woven fabric 2 and FIG. 2B is a model diagram illustrating the second method for the formation thereof. By these methods, the woven fabric 2 having all the raw material fibers thereof extended perpendicularly or obliquely relative to the direction of compression (the vertical direction in the diagrams) during the course of the hot-press fabrication.

The first method of FIG. 2A (hereinafter referred to as "biaxial three-dimensional weave") forms a biaxial three-dimensional woven fabric by dividing the raw material fibers into wefts 1a and warps 1b, laying the wefts 1a extending in the direction y (the direction perpendicular to the surface of the Fig.) in a multiplicity of layers, and causing the warps 1b extending in the direction x while undulating vertically in the direction z to intersect alternating groups each of not less than two layers of the wefts 1a. The construction of FIG. 2A-a uses the wefts 1a as divided into bundles of two wefts each and that of FIG. 2A-b uses the wefts 1a as divided independently of each other.

In the biaxial three-dimensional weave, the warps 1a and the wefts 1b both extend nearly horizontally. When the compressing force produced during the course of the hot-press fabrication is caused to act in the vertical direction in the bearings of the diagram, the compressing force during the course of the hot-press fabrication acts nearly in the lateral direction on substantially all the fibers. The fibers, therefore, do not easily kink or a shear. Since the compressing force acts in the direction of contracting the distances between the adjacent fibers, the fibers are allowed to form a dense matrix layer without giving rise to voids. Consequently, a fiber-bond type ceramic material retaining a high fiber content and having high heat-resistant strength can be produced. The three-dimensionally integrated fiber-bond type ceramic material acquires a dense texture embracing very few pores between the fibers and, therefore, does not easily induce peels and cracks in the boundary faces or superimposed faces of the fibers.

The second method of FIG. 2B (hereinafter referred to as "overlap weave") forms a woven fabric by dividing the raw material fibers 1 into wefts 1a and warps 1b, forming biaxial two-dimensional planar woven fabrics with the wefts 1a and the warps 1b, superimposing the planar woven fabrics thereby forming a superimposed-layer woven fabric, and integrating this superimposed-layer woven fabric with obliquely and alternately intersecting third threads c. In this overlap weave, since the compressing force of the hot-press fabrication can be caused to act nearly perpendicularly on the wefts 1a and the warps 1b and obliquely on the third threads 1c, a dense fiber-bond type ceramic material can be produced similarly to the first method.

When engine parts, e.g., gas turbine parts, are manufactured by shaping the fiber-bond type ceramic material produced as described above, the parts do not easily peel or crack in the boundary faces or superimposing faces of the fibers.

EXAMPLE

Table 1 shows the test results obtained of the fiber-bond type ceramic materials produced by the methods of this invention described above. In this test, Lox M grade Tyranno fibers were used as the raw material fibers 1.

TABLE 1

| Texture | Biaxial three dimensional weave | | Overlap weave |
| --- | --- | --- | --- |
| | a | b | |
| Ratio of X:Y:Z | 1:0.9:0 | 1:1.1:0 | 1:1:0.14 |
| Thickness, mm | ca.7 | ca.3.5 | ca.3 |
| Vf, %: Volum etric fiber content | 40~50 | 40~50 | 40~50 |
| Bending   Direction of X | 115.9 | 158.1 | 160.3 |
| strength   Direction of Y | 256.1 | 169.5 | 155.8 |

In this table, the ratio (X:Y:Z) means the fiber volume ratio of wefts, warps, and third threads and the Vf (fiber volume fraction) means the volumetric proportion of the part having the fibers retain their shape during the formation of a woven fabric. The bending strength (X direction and Y direction) denotes the maximum breaking stress manifested when the bending moment is exerted severally on the wefts and the warps.

It is noted from Table 1 that fiber-bond type ceramic materials possessing fully satisfactory strength and a high volumetric fiber content can be produced invariably by the methods of "biaxial three-dimensional weave" and "overlap weave" shown in FIGS. 2A and 2B. The photomicrographs of the produced ceramic materials confirm that the ceramic materials form a dense matrix layer having no voids interposed between the raw material fibers, though this fact is not reflected in the data of the table.

Figure 3A:
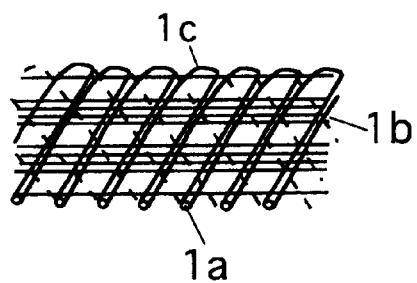
FIG. 3A is a model diagram illustrating the third method for forming a woven fabric according to the invention.
Figure 3B:
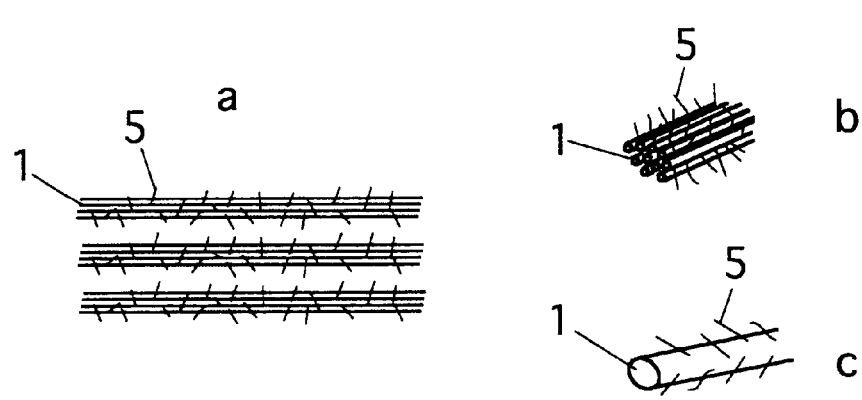
FIG. 3B is a model diagram illustrating the fourth method for forming a woven fabric.

FIG. 3A is a model diagram illustrating the third method and FIG. 3B a model diagram illustrating the fourth method for forming a woven fabric. Invariably by these methods, the interwoven fabric 2 having all the raw material fibers extended perpendicularly or obliquely therein relative to the direction in which the compression was applied during the course of the hot-press fabrication can be formed.

The third method of FIG. 3A (hereinafter referred to as "net shape weave") comprises superposing the raw material fibers (in plane fibers 1a and 1b) as evenly arranged perpendicularly to the direction of compression, causing third threads 1c to intersect the inplane fibers obliquely as illustrated in the diagram, and allowing the inplane fibers 1a and 1b to be bundled between the surface and fourth fibers 1d. The oblique direction of the third fibers 1c maybe wholly identical or maybe alternately reversed as indicated by a broken line in the diagram. This method nullifies the occurrence of kinks due to the compression during the course of hot-press fabrication and minimizes the occurrence of voids liable to form in the fibers.

The fourth method of FIG. 3B (hereinafter referred to as "flex weave") forms a woven fabric by preparing short fiber-bound fibers having raw material fibers 1 interlaced in advance with short fibers 5 of identical substance and superposing these fibers perpendicularly to the direction of compression as illustrated in FIG. 3B-a. This method likewise enables the compressing force generated during the course of the hot-press fabrication to act perpendicularly on the raw material fibers and, at the same time, nullifies the occurrence of kinks due to the compression during the course of hot-press fabrication and minimizes the occurrence of voids liable to form in the fibers and, therefore, allows relatively inexpensive production of a fiber-bond type ceramic material. This method permits use of fibers which possess fluffs of barbs as illustrated in FIG. 3B-c.

The method of this invention for the production of a fiber-bond type ceramic material and the engine parts made of this ceramic material can bring about prominent effects such as, for example, rendering difficult peeling or cracking in the boundary faces or superimposed faces of fibers, allaying the injury inflicted on the raw material fibers by the impact of hot-press fabrication, precluding easy formation of voids between the raw material fibers, and consequently allowing formation of a dense matrix layer and impartation of a high volumetric fiber content to the material as described above.

While there have been shown and described several preferred embodiments of the invention, it is to be understood that the invention is not limited thereto but maybe otherwise variously embodied and practiced within the scope of the claims annexed hereto.

What is claimed is:

1. A method for the production of a fiber-bond ceramic material, comprising the steps of:

providing raw material fibers threads of Si—M—C—O synthesized by melt spinning polymetal carbosilane;

infusibilizing the threads;

firing the threads;

forming a woven fabric from the threads;

heat treating the woven fabric in air, whereby an oxide layer is produced on said fabric; and hot pressing the fabric in a pressing direction, wherein the threads are either normal to or oblique to the pressing direction, and whereby the oxide layers adhere to form a matrix of fiber-bond ceramic material.

2. A method according to claim 1, wherein said woven fabric is formed by dividing the fiber threads into warps and wefts, laying the wefts in a plurality of layers and interweaving the warps to intersect with no less than two layers of wefts.

3. A method according to claim 1, wherein said woven fabric is formed by dividing said raw material fibers into wefts and warps, forming biaxial two dimensional planar woven fabrics with said wefts and warps, superimposing said planar woven fabrics to form a superimposed woven fabric, and integrating said superimposing woven fabric with obliquely and alternately intersecting third threads.

4. A method according to claim 1, wherein said woven fabric is formed by dividing said raw material fibers into first and second inplane fibers arranged in a plane perpendicular to the direction of pressing, obliquely intersecting third fibers with the inplane fibers, and bundling the inplane fibers between a surface of the fabric and fourth fibers.

* * * * *